(12) United States Patent
Simon et al.

(10) Patent No.: US 7,020,362 B2
(45) Date of Patent: Mar. 28, 2006

(54) LOW COST OPTICAL INTERCONNECT FOR FIBER OPTIC SYSTEM

(76) Inventors: Jonathan Simon, 22363 Moyers St., Castro Valley, CA (US) 94548; Lisa A. Windover, 3757 Webster St., Apt. #105, San Francisco, CA (US) 94123; Steven A. Rosenau, 305 Cypress Point Dr., Mountain View, CA (US) 94043

( * ) Notice: Subject to any disclaimer, the term of this patent is extended or adjusted under 35 U.S.C. 154(b) by 23 days.

(21) Appl. No.: 10/635,810

(22) Filed: Aug. 5, 2003

(65) Prior Publication Data

US 2005/0031265 A1 Feb. 10, 2005

(51) Int. Cl.
*G02B 6/26* (2006.01)
*G02B 6/42* (2006.01)

(52) U.S. Cl. .................. 385/31; 385/15; 385/48; 385/88; 385/89

(58) Field of Classification Search ........... 385/14–94
See application file for complete search history.

(56) References Cited

U.S. PATENT DOCUMENTS

| 5,129,032 A * | 7/1992 | Kawai et al. ............ 385/76 |
| 5,305,401 A | 4/1994 | Becker et al. |
| 6,307,987 B1 * | 10/2001 | Wang et al. ............ 385/31 |
| 6,832,861 B1 * | 12/2004 | Kragl ................... 385/88 |

FOREIGN PATENT DOCUMENTS

| GB | 2168165 A |   | 12/1984 |
| GB | 2168165 A | * | 6/1986 |
| JP | 56085703 |   | 7/1981 |
| JP | 56111811 |   | 9/1981 |
| JP | 58171019 |   | 10/1983 |
| WO | WO96/07117 |   | 8/1995 |

* cited by examiner

*Primary Examiner*—Frank G. Font
*Assistant Examiner*—Derek L. Dupuis

(57) ABSTRACT

A single channel optical interconnect for a fiber optic system includes a penetrator made of optically transmissive material and configured for insertion along the length of a plastic optical fiber for transferring light between the optical fiber and an optoelectronic device. A multiple channel optical interconnect uses a linear array of optoelectronic devices and corresponding optically transmissive penetrators. The penetrators may be pyramidal or conical bodies made of plastic or glass that are positioned above corresponding vertical cavity surface emitting lasers (VCSELs). The penetrators may also be etched directly into the substrates of bottom emitting VCSELs. The penetrators may have specially tailored side wall angles, or coatings, to facilitate coupling into the optical fibers and minimize back reflections into the VCSELs.

18 Claims, 2 Drawing Sheets

LOW COST OPTICAL INTERCONNECT FOR FIBER OPTIC SYSTEM

FIELD OF THE INVENTION

The present invention relates to fiber optic technology, and more particularly, to devices that couple light from the source into an optical fiber or couple light out of an optical fiber to a detector.

BACKGROUND OF THE INVENTION

LEDs are widely used in short haul fiber optic systems because they are relatively inexpensive, however, they are limited to lower speed applications, e.g. a top bandwidth of 100–300 MHz. The three main types of laser diodes used in fiber optic systems are the Fabry-Perot (FP) laser diode, the distributed feedback (DFB) laser diode and the vertical cavity surface emitting laser (VCSEL). The three main types of detectors that are used in fiber optic systems are PIN photo diodes, integrated detector/pre-amplifiers (IDPs), and avalanche photo-diodes (APDs), with PIN photo diodes being the most commonly used detector.

FIG. 1 illustrates a conventional parallel fiber optic interconnect arrangement 10 that employs an edge emitter approach. It comprises a 1×4 array 12 of edge emitting laser diodes attached to a ceramic submount 14 and positioned opposite four facets of a 1×4 array 16 of optical fibers. The ceramic submount 14 is supported on a silicon block 18. Alignment within five microns is typically required along both the X and Y axes. The optical fibers 16 sit side-by-side within upwardly opening V-shaped grooves 20 etched in the upper surface of another silicon support block 22. The height of block 22, the placement of the V-shaped grooves 20 relative to block 22, and the optical fibers 16 in them is generally very precise. What is generally not as precise is the gap between submount 14 and silicon block 18, and between the silicon block 18 and the grooves 20, and the package (not pictured) below. In order to align in two axes, either the parts need to be made to high precision, which is costly, or aligned in multiple axes, either actively (device on) or passively (using fiducials), which is also costly.

SUMMARY OF THE INVENTION

In accordance with the invention, a low cost optical interconnect is provided that simplifies the alignment between an emitter or detector on the one hand, and an optical fiber on the other hand, that is required in order to minimize signal losses.

In a single channel form of an embodiment in accordance with the invention an optical interconnect for a fiber optic system includes a penetrator made of a suitable optically transmissive material that is optically coupled to an optoelectronic device and configured for insertion into a plastic optical fiber and transferring light between the optical fiber and the optoelectronic device.

In a multiple channel form of another embodiment in accordance with the invention an optical interconnect for a fiber optic system includes a plurality of penetrators each made of a suitable optically transmissive material that are optically coupled to a corresponding one of a plurality of optoelectronic devices and configured for insertion along the length of a corresponding plastic optical fiber of a side-by-side array of a plurality of plastic optical fibers for transferring light between the optical fibers and the corresponding optoelectronic devices.

In accordance with the invention, a method of providing an optical interconnect in a fiber optic system is provided. The method includes the steps of providing an optoelectronic device and providing a plastic optical fiber. A penetrator made of a suitable optically transmissive material is positioned relative to the optoelectronic device in a manner that allows light to be transferred between the penetrator and the optoelectronic device. The penetrator is inserted through a sidewall of the optical fiber along the length of a plastic optical fiber in a manner that allows light to be transferred between the optical fiber and the optoelectronic device through the penetrator.

DETAILED DESCRIPTION

The low cost optical interconnects described hereafter are intended for use with plastic optical fiber (POF) which is an alternative to the more conventional glass optical fiber (GOF). Recent advances have produced plastic optical fiber capable of significant performance that makes it attractive for use on short to medium length transmission paths. For example, relatively high bandwidth can be achieved with low loss, graded index plastic optical fiber made from perfluorinated polymer surrounded by an acrylic reinforcement layer. Such fiber has demonstrated transmission rates in excess of eleven gigabits per second over lengths of one hundred meters with losses as low as twenty decibels per kilometer.

Plastic optical fiber is typically much larger in diameter than glass optical fiber. For example, a plastic optical fiber may have an outer cladding diameter of 200–300 microns with a core diameter of 120–180 microns. The outer protective jacket is typically 500–1000 microns in diameter. Due to this relatively large diameter, transmission of data is possible even if the ends of the plastic optical fiber are damaged or soiled, or if the axis of the fiber is slightly off center. As a result, optical connectors for plastic optical fiber can be simpler and less expensive than their counterparts used to connect glass optical fibers. Plastic optical fiber is very strong and relatively easy to bend. A razor or other sharp implement can be used to cut plastic optical fiber to produce a flat end or facet that can be mated with a similarly cut plastic optical fiber that will introduce, for example, about three decibels of loss in the light passing through the junction. The end of a plastic optical fiber can be heated and softened, and then pushed against a mirrored surface making installation of plastic optical fiber much simpler than glass optical fiber. Plastic optical fiber typically has relatively small losses even when bent to a twenty-five millimeter radius. Therefore plastic optical fiber is well suited for installation in walls and other tight areas when connecting computer and communications equipment within a home or office.

In accordance with the invention a less stringent alignment is required for plastic optical fiber. The plastic optical fiber can be readily pierced particularly when it has been heated to soften the same, to allow the insertion of a penetrator coupled to an optoelectronic device as explained in detail hereafter. Glass optical fiber is extremely hard at ambient temperature and cannot be readily pierced with a foreign object in the sense that plastic optical fiber may be pierced. Glass optical fiber would have to be heated to a very high temperature to soften the same such that any penetrator then introduced would be damaged and/or any light conversion device coupled thereto would also be damaged. Softening of glass optical fiber can also impair its low loss transmission capabilities.

Figure 2:
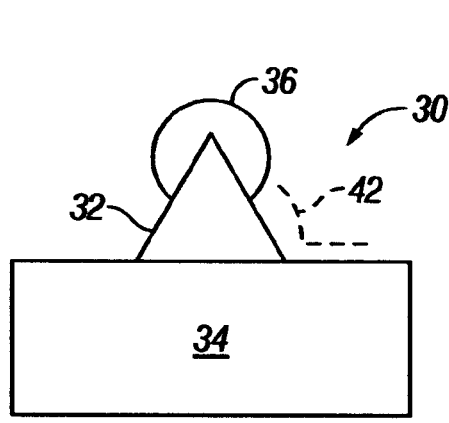
FIG. 2 is an enlarged diagrammatic end view that illustrates a single channel embodiment of a low cost optical interconnect in accordance with the invention.
Figure 3:
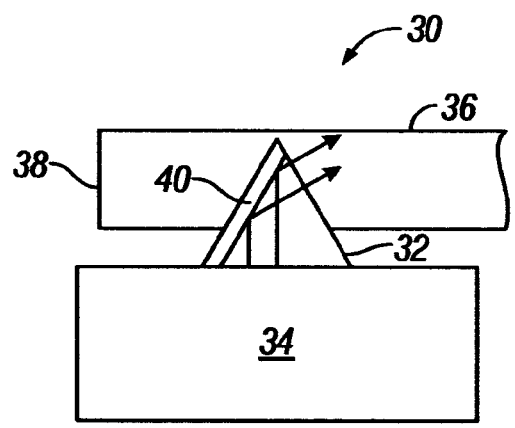
FIG. 3 is a side elevation view of the optical interconnect of FIG. 2.

FIGS. 2 and 3 illustrate a low cost single channel optical interconnect 30 comprising a generally pyramidal or conical penetrator 32 optically coupled to an optoelectronic device 34 and configured for piercing a plastic optical fiber 36 and transferring light between the plastic optical fiber 36 and the optoelectronic device 34. A significant difference between the optical interconnect 30 and prior art optical interconnects is that the optical interconnect 30 couples the optoelectronic device 34 along the optical fiber 36 rather than at its end face or facet 38. This approach effectively eliminates the need for precise alignment along the Y axis and allows for a low cost passive alignment approach.

The optoelectronic device 34 may be an emitter or a photo detector of the type best suited for use with the plastic optical fiber 36. Thus the term "optoelectronic device" includes, without limitation, LEDs, Fabry-Perot (FP) laser diodes, distributed feedback (DFB) laser diodes, vertical cavity surface emitting lasers (VCSELs), PIN photo diodes, integrated detector/pre-amplifiers (IDPs), and avalanche photo-diodes (APDs). The optoelectronic device 34 of the optical interconnect 30 illustrated in FIGS. 2 and 3 is a top emitting vertical cavity surface emitting laser (VCSEL). The penetrator 32 is positioned directly on top of the output surface of the VCSEL and serves not only to penetrate the optical fiber 36 but also optically couples the VCSEL and the optical fiber 36. The penetrator 32 may also be etched directly into the substrate of the optoelectronic device 34. As shown by the arrows in FIG. 3, light from the output surface of the optoelectronic device (VCSEL) 34 is reflected off a coating 40 on the angled sidewall of the penetrator 32 and is injected into the optical fiber 36. The coating 40 may be made of a suitable material, such as gold. The coating 40 may not be needed, and the penetrator 32 could instead be fabricated to rely solely on total internal reflection to produce the required optical coupling. Where the optoelectronic device 34 is a detector, the opposite action will occur so that light from the optical fiber 36 is routed to the active face of the optoelectronic device 34 for conversion into an electrical signal. The penetrator 32 could alternatively have at least one wall coated with a material that facilitates coupling of the light from the optoelectronic device 34 to the optical fiber 36.

The penetrator 32 (FIGS. 2 and 3) may have specially tailored side wall angles, or coatings, to facilitate coupling into the optical fiber 36 and minimize back reflections into the VCSEL 34. The penetrator 32 may be fabricated out of suitable optically transparent material such as plastic or glass. The penetrator 32 may be etched into the substrate of a bottom illuminated or bottom emitting optoelectronic device. The penetrator 32 may be bonded to the optoelectronic device 34 with suitable adhesive or in any other suitable manner that will firmly connect the two devices so as not to adversely impair the transfer of light from the VCSEL 34 through the penetrator 32 to the optical fiber 36. The penetrator 32 may be sharp enough to pierce the plastic optical fiber 36 at ambient temperature by pressing it into the optical fiber 36 a suitable depth, preferably without going all the way through the optical fiber 36. In the preferred embodiment, the penetrator 32 extends at least half way across the diameter of the optical fiber 36. Alternatively, the plastic optical fiber 36 may be heated to a predetermined temperature above ambient sufficient to soften the same to ease and facilitate the insertion process. Where the penetrator 32 is also made of a plastic material care should be taken not to soften the same, either by separately heating the plastic optical fiber 36 and/or by fabricating the penetrator 32 out of a plastic material with a significantly higher melting point. Alternatively, the penetrator 32 could be heated to ease and facilitate the insertion process.

The single channel optical interconnect 30 could be encapsulated with a suitable gel, potting compound or other material for the purpose of stabilizing the structure. This encapsulation layer is illustrated diagrammatically as a dashed line 42 in FIG. 2. The encapsulation layer 42 could serve only as a bonding layer between the optoelectronic device 34 and the penetrator 32 or it could also extend over these two components and the joined optical fiber 36 as well to facilitate the maintenance of proper alignment and to accommodate stresses that would otherwise lead to breakages or other failures in the optical interconnect 30. The encapsulation layer 42 could surround all of the structure shown in FIGS. 2 and 3 to form a hermetic seal and produce a low cost rugged package.

Figure 1:
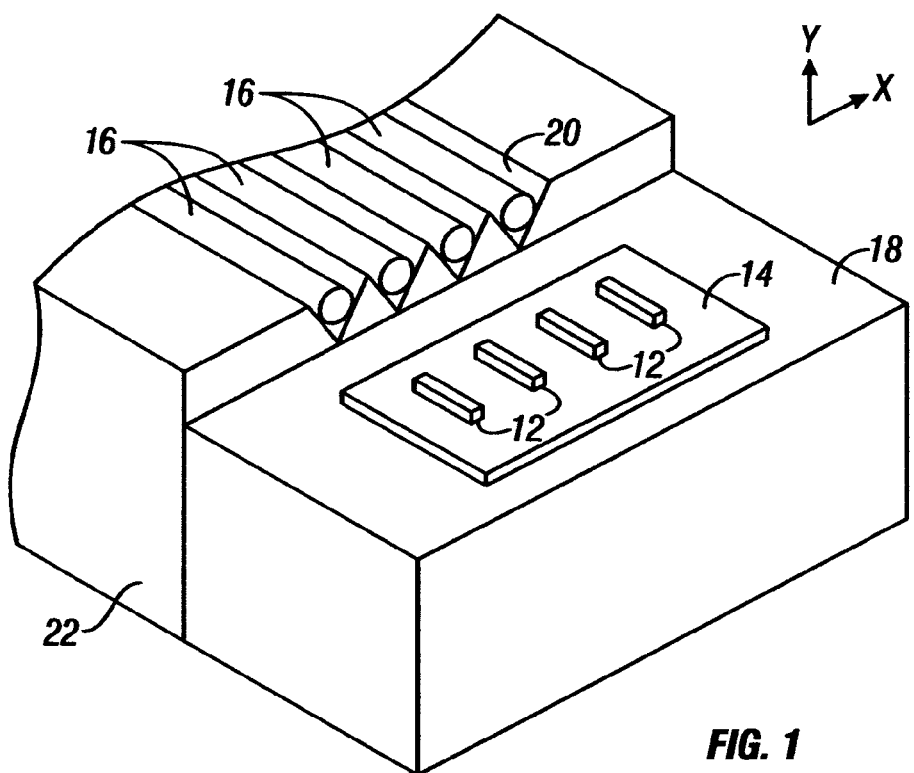
FIG. 1 is an enlarged, diagrammatic fragmentary perspective view that illustrates a conventional (prior art) parallel fiber optic interconnect arrangement.
Figure 4:
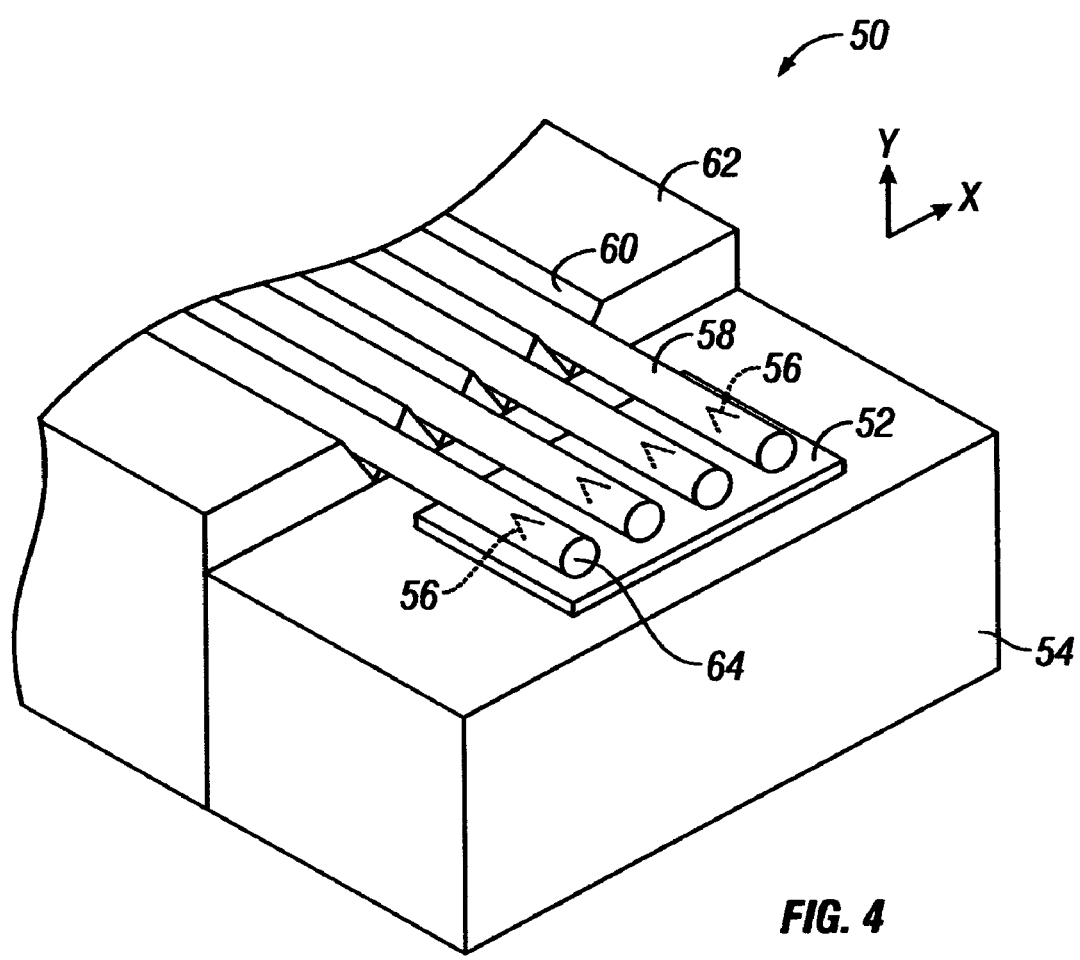
FIG. 4 is an enlarged, diagrammatic fragmentary perspective view that illustrates a multiple channel embodiment of a low cost parallel fiber optic interconnect in accordance with the invention.

FIG. 4 illustrates a low cost multiple channel parallel fiber optic interconnect 50 comprising a 1×4 array of VCSELs (not visible) attached to a common ceramic substrate or die 52 supported on a silicon block 54. The common ceramic substrate or die 52 may be omitted so that the VCSEL array would be mounted directly to a silicon or GaAs substrate or a thermoelectric cooler. The silicon substrate may also be an integrated circuit. Four penetrators 56 shown in phantom lines are each mounted above a corresponding one of the VCSELs. Each of the penetrators 56 pierces a corresponding one of the plastic optical fibers of a 1×4 array of plastic optical fibers 58. The optical fibers 58 sit side-by-side and extend in parallel fashion within upwardly opening V-shaped grooves 60 etched in the upper surface of another silicon support block 62. The optical fibers 58 are pressed onto the penetrators 56 at an elevated temperature or otherwise. The permissible tolerance along the X axis is greater than in the conventional approach illustrated in FIG. 1. The need for precise alignment along the Y axis is eliminated in the multiple channel parallel fiber optic interconnect 50 illustrated in FIG. 4. More specifically, the costly active alignment step of adjusting the height of the die 52 relative to the silicon support block 54 and/or the height of the silicon support block 54 relative to the height of the silicon support block 62 is unnecessary. Selected portions of, or the complete exterior of, the interconnect 50 may be encapsulated in a suitable material (not illustrated) for improved shock resistance, hermeticity, etc. A significant difference between the parallel optical interconnect 50 and the prior art parallel optical interconnect of FIG. 1 is that the optical interconnect 50 couples the optoelectronic devices along the optical fibers 58 rather than through the end faces or facets 64 thereof. This approach effectively eliminates the requirement for precise alignment along the Y axis and allows for a low cost passive alignment approach. Just as with the single channel optical interconnect 30 of FIGS. 2 and 3, the shape of the penetrators 56 of the multiple channel fiber optic interconnect 50 of FIG. 4 can be varied and coatings applied to improve the ease of assembly and/or efficiency of light transfer between the optical fibers 58 and the optoelectronic devices attached to the ceramic submount 52.

Referring to FIGS. 2 and 3, with reference to a single channel optical interconnect 30, a method of providing an optical interconnect in a fiber optic system includes the steps of providing an optoelectronic device 34 and providing a plastic optical fiber 36 in either order. A penetrator 32 made of a suitable optically transmissive material is positioned relative to the optoelectronic device 34 in a manner that allows light to be transferred between the penetrator 32 and the optoelectronic device 34. Again the order of this step relative to the first two steps is unimportant. According to the final step of our basic method, the penetrator 32 is inserted through a sidewall of the optical fiber 36 along the length of a plastic optical fiber 36 in a manner that allows light to be transferred between the optical fiber 36 and the optoelectronic device 34 through the penetrator 32. Various minimal alignment steps along the X and/or Y axes can be performed during the insertion step, but no real alignment along the longitudinal axis of the optical fiber 36 is needed. The optional step of encapsulating all or part of the optical interconnect 30 can be performed at any stage. The penetrator 32 could be inserted into the plastic optical fiber 36 and then positioned adjacent the optoelectronic device 34. We have similarly invented an analogous method of providing a multiple channel optical interconnect 50.

Having described several embodiments in accordance with the invention of a low cost optical interconnect for a fiber optic system, and a method of interconnecting plastic optic fibers and optoelectronic devices, modifications and adaptations thereof will readily occur to those skilled in the art. For example, the penetrator 32 could pierce an unaltered plastic optical fiber 36 by reason of its sharpness, or it could pierce such a fiber by merely being inserted in a slice or other physical entry previously made in the plastic fiber by a blade, laser or other suitable cutting means. In the latter approach, the penetrator 32 need not have a sharp or pointed configuration since it will not be the implement that slices into the plastic fiber 36. By way of further example, the penetrators 56 need not be physically coupled to the optoelectronic devices but could be supported by other structure so that they would be positioned adjacent to the optoelectronic devices. Therefore, the protection afforded embodiments in accordance with the invention should only be limited in accordance with the scope of the following claims.

We claim:

1. An optical interconnect for a fiber optic system, comprising:
    an optoelectronic device selected from the group consisting of a top emitting vertical cavity surface emitting laser (VCSEL) and a bottom emitting VCSEL; and
    a penetrator made of a suitable optically transmissive material etched into a substrate of the optoelectronic device and configured for insertion along the length of an optical fiber for transferring light between the optical fiber and the optoelectronic device.

2. The interconnect of claim 1 wherein the penetrator has a pyramidal shape.

3. The interconnect of claim 1 wherein the penetrator has a conical shape.

4. The interconnect of claim 1 wherein the penetrator has at least one wall coated with a material that minimizes reflection of light back into the optoelectronic device.

5. The interconnect of claim 1 wherein the penetrator has at least one wall coated with a material that facilitates coupling of light from the optoelectronic device to the optical fiber.

6. The interconnect of claim 1 and further comprising an optical fiber having the penetrator pierced therein to optically couple the optoelectronic device and the optical fiber.

7. The interconnect of claim 6 and further comprising an encapsulation layer at least partially surrounding the optoelectronic device and the penetrator.

8. The interconnect of claim 1 and further comprising a plastic optical fiber, and wherein the penetrator is inserted along the length of the plastic optical fiber at least halfway across a diameter of the optical fiber.

9. A parallel optical interconnect for a fiber optic system, comprising:
    a plurality of optoelectronic devices arranged in a linear array selected from the group consisting of a top emitting vertical cavity surface emitting laser (VCSEL) and a bottom emitting VCSEL; and
    a plurality of penetrators each made of a suitable optically transmissive material and etched into a substrate of a corresponding one of the optoelectronic devices and configured for insertion along the length of a corresponding plastic optical fiber of a side-by-side array of a plurality of plastic optical fibers for transferring light between the optical fibers and the corresponding optoelectronic devices.

10. The interconnect of claim 9 wherein each penetrator has a pyramidal shape.

11. The interconnect of claim 9 wherein each penetrator has a conical shape.

12. The interconnect of claim 9 wherein each penetrator has at least one wall coated with a material that minimizes reflection of light back into the corresponding optoelectronic device.

13. The interconnect of claim 9 wherein each penetrator has at least one wall coated with a material that facilitates coupling of light from the optoelectronic device to the corresponding optical fiber.

14. The interconnect of claim 9 and further comprising a plurality of optical fibers each having a corresponding one of the penetrators pierced therein to optically couple each optoelectronic device to its corresponding optical fiber.

15. The interconnect of claim 14 and further comprising an encapsulation layer at least partially surrounding the optoelectronic devices and the penetrators.

16. The interconnect of claim 9 wherein the optoelectronic devices are attached to a support selected from the group consisting of a common ceramic substrate, a common silicon substrate and a common integrated circuit.

17. An optical interconnect for a fiber optic system, comprising:
    an optoelectronic device; and
    a penetrator made of a suitable optically transmissive material etched into a substrate of the optoelectronic device, the penetrator being optically coupled to the optoelectronic device and configured for insertion along the length of an optical fiber for transferring light between the optical fiber and the optoelectronic device.

18. An parallel optical interconnect for a fiber optic system, comprising:
    a plurality of optoelectronic devices arranged in a linear array; and
    a plurality of penetrators each made of a suitable optically transmissive material and etched into a substrate of a corresponding one of the optoelectronic devices, the penetrators being optically coupled to the corresponding optoelectronic devices and configured for insertion along the length of a corresponding plastic optical fiber of a side-by-side array of a plurality of plastic optical fibers for transferring light between the optical fibers and the corresponding optoelectronic devices.

* * * * *